(12) United States Patent
Jones et al.

(10) Patent No.: US 6,463,510 B1
(45) Date of Patent: Oct. 8, 2002

(54) APPARATUS FOR IDENTIFYING MEMORY REQUESTS ORIGINATING ON REMOTE I/O DEVICES AS NONCACHEABLE

(75) Inventors: Phillip M. Jones, Spring, TX (US); Robert L. Woods, Allentown, PA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 123 days.

(21) Appl. No.: 09/751,505

(22) Filed: Dec. 29, 2000

(51) Int. Cl.$^7$ .............................................. G06F 12/00
(52) U.S. Cl. ...................................... 711/138; 711/141
(58) Field of Search .................................. 711/138, 141

(56) References Cited

U.S. PATENT DOCUMENTS

| | | | | |
|---|---|---|---|---|
| 5,890,216 A | * | 3/1999 | Derrick et al. | 711/138 |
| 5,918,069 A | * | 6/1999 | Matoba | 711/138 |
| 6,128,711 A | * | 10/2000 | Duncan et al. | 711/141 |
| 6,338,119 B1 | * | 1/2002 | Anderson et al. | 711/138 |

* cited by examiner

Primary Examiner—Jack A. Lane
(74) Attorney, Agent, or Firm—Conley, Rose & Tayon, P.C.

(57) ABSTRACT

An apparatus for identifying memory requests originating on remote I/O devices as non-cacheable in a computer system with multiple processors includes a main memory, memory cache, processor, cache coherence directory and cache coherence controller all coupled to a host bridge unit (North bridge). The I/O device transmits requests for data to an I/O bridge unit. The I/O bridge unit forwards the request for data to the host bridge unit and asserts a sideband signal to the host bridge unit if the request is for non-cacheable data. The sideband signal informs the host bridge unit that the memory request is for non-cacheable data and that the cache coherence controller does not need to perform a cache coherence directory lookup. For cacheable data, the cache coherence controller performs a cache coherence directory lookup to maintain the coherence of data stored in a plurality of processor caches in the computer system.

20 Claims, 2 Drawing Sheets

APPARATUS FOR IDENTIFYING MEMORY REQUESTS ORIGINATING ON REMOTE I/O DEVICES AS NONCACHEABLE

CROSS-REFERENCE TO RELATED APPLICATIONS

This application relates to the following commonly assigned co-pending application entitled "System For Identifying Memory Requests As Non-cacheable To Reduce Cache Coherence Directory Lookups And Bus Snoops," Ser. No. 09/751,128, filed Dec. 29, 2000, which is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to sharing data among processors using cache memories in a computer system with multiple processors. More particularly, the present invention relates to maintaining the coherence of data in cache memories by using a cache coherence directory and bus snooping. Still more particularly, the invention relates to a computer system in which a sideband signal identifies memory requests as non-cacheable to minimize cache coherence directory lookups and bus snoops.

2. Background of the Invention

Modem day computer systems can include a single processor or multiple processors for higher performance. A host bridge unit coupled to each processor of the multiprocessing computer system allows the computer system to support many different kinds of devices attached to a multitude of different buses. The host bridge unit may connect to processor buses, a main memory bus, I/O bus, and connected through an I/O bridge unit, an advanced graphic port ("AGP") bus, peripheral component interconnect ("PCI") bus or peripheral component interconnect extended ("PCIx") bus. Each of the processor buses can support a maximum number of processors (e.g. 4, 6, 8, 12 etc.) connected to the processor bus while still maintaining bus communication bandwidth for sufficiently high performance.

Each processor of the computer system includes a memory cache either integrated into the processor chip itself or external to the processor chip. The memory cache stores data and instructions and improves processor performance by allowing high-speed access to the needed data and instructions resulting in reduced program execution time. In a computer system with multiple processors, each unit of data is identified as being owned by a particular processor. Requestor processors in the computer system may request a unit of data from an owner processor. The requesting processor may access data to perform either read or write operations. If a requesting processor modifies the data by performing a write, other processors of the computer system may have access to old, unmodified versions of the data. To remedy this problem, each processor maintains a local record of the addresses cached on the various processors and the particular "state" of each unit of data associated with the address in a cache coherence directory.

A "state" describes the copies of the data unit stored in the memory caches of the particular system. The computer system, using a cache coherence directory, implements a coherency protocol that enforces the consistency of data in the cache memories. The coherency protocol describes the different states of a data unit. A data unit may be in a shared state that corresponds to processors having a read only copy of the data unit. Alternatively, a data unit may be in an exclusive state in which only one requestor processor contains a copy of the data unit that it may modify.

Use of a coherence protocol requiring a cache coherence directory may call for excessive utilization of the processor bus interconnecting the processors. A "bus snoop" involves accessing the bus to communicate with processors on the processor bus to monitor and maintain coherency of data. A bus snoop is needed whenever a requestor processor needs access to data that it does not have an exclusive copy of or is not the owner. Large amounts of snoop traffic can seriously impact computer system performance. One solution to this problem is to compare the address of the data to the cache coherence directory to determine if one of the other processors owns the address or has an exclusive copy. If the cache coherence directory indicates ownership of the address or an exclusive copy by a different processor, a bus snoop is performed. If the requesting processor owns the address or has an exclusive copy, a bus snoop is not performed, thus preserving processor bus bandwidth.

Hardware to maintain the coherency of the data includes a cache coherence controller and cache coherence directory. The cache coherence directory preferably includes enough Random Access Memory ("RAM") to maintain a sufficient record of the addresses cached on the various processors and the particular state of each unit of data associated with the address. It would be advantageous if the cache coherence directory and cache coherence protocol could be implemented in such a way as to be able to quickly retrieve memory requests from the processor and peripheral devices. To implement a fast cache coherence directory, interleaved banks of RAM can be used. To further reduce the access time for processor and peripheral device memory requests, the cache coherence protocol could be implemented to reduce the number of memory requests that must be compared to the cache coherence directory. One way to reduce memory request access times would be for the host bridge unit to identify memory requests from peripheral devices as non-cacheable and then skip the cache coherence directory lookup and bus snoop.

The current generation of host bridge units has no dedicated hardware support for the identification of non-cacheable memory requests. Furthermore, the next generation of AGP bus implementations in computer systems will have graphics devices coupled to an I/O bridge in order to permit greater flexibility in the I/O subsystem. Thus, graphics devices will send requests for data stored in memory to the I/O bridge that will then forward the request to the host bridge. Even if the graphics device and AGP bus are implemented to inform the I/O bridge that the data requested is non-cacheable, because host bridge units have no dedicated hardware support for identification of non-cacheable memory requests, the information that the data for the memory request is non-cacheable will not be provided to the host bridge.

For the reasons discussed above, it would be advantageous to design a computer system with dedicated hardware capable of informing the host bridge that a memory request from a graphics device is to non-cacheable data so as to bypass the cache coherence directory lookup and bus snoop. Despite the apparent performance advantages of such a system, to date no such system has been implemented.

BRIEF SUMMARY OF THE INVENTION

The deficiencies of the prior art described above are solved in large part by an apparatus for identifying memory requests originating on remote I/O devices as non-cacheable in a computer system with multiple processors. The apparatus includes a main memory, memory cache, processor and cache coherence directory all coupled to a host bridge unit (North bridge or memory controller). The I/O device transmits requests for data to the I/O bridge unit. The I/O bridge unit forwards the request for data to the host bridge unit and asserts a sideband signal to the host bridge unit if the request is for non-cacheable data. The host bridge unit includes a cache coherence controller that implements a protocol to maintain the coherence of data stored in each of the processor caches in the computer system. The cache coherence directory connects to the cache coherence controller. If the host bridge unit determines that the data is cacheable, (i.e. the sideband signal is not asserted) then it requests the cache coherence controller to perform a cache coherence directory lookup to maintain the coherence of the data. If the data is non-cacheable, (i.e. the sideband signal is asserted) then the host bridge unit does not request the cache coherence controller to perform a cache coherence directory lookup. Various I/O devices can be coupled to the I/O bridge unit through an AGP bus, PCI bus, or PCIX bus.

The preferred embodiment of the invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
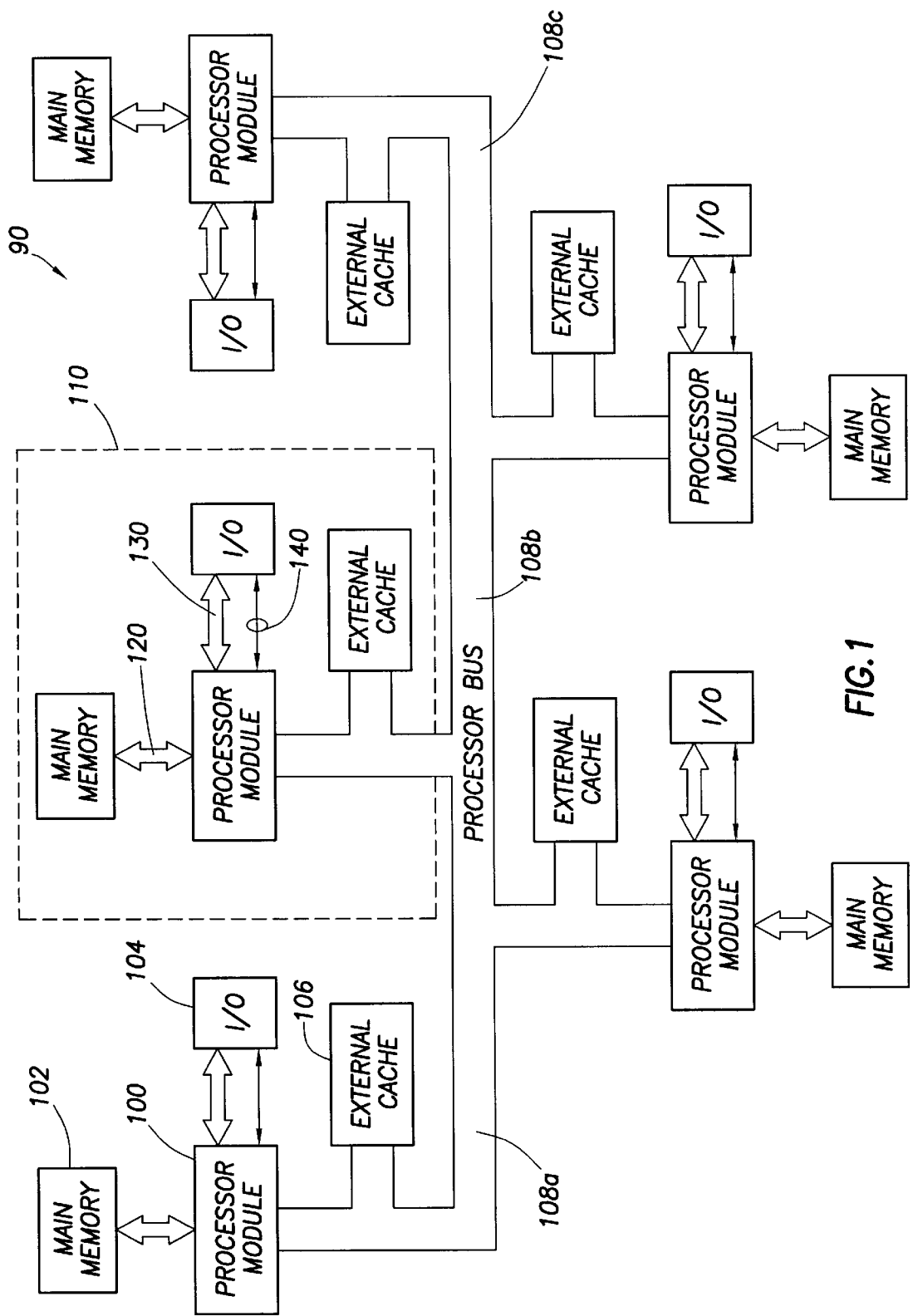
FIG. 1 shows a system diagram of a plurality of processors coupled together through a multitude of processor buses.

Referring now to FIG. 1, in accordance with the preferred embodiment of the invention, computer system 90 comprises one or more processor modules 100 coupled to a main memory 102 and an input/output ("I/O") bridge unit 104. As shown, computer system 90 includes five processor modules 100, each processor module 100 coupled to a main memory 102, an external memory cache 106, and an I/O bridge unit 104. Each processor preferably includes processor buses 108 for connection to adjacent processors. A processor module 100 preferably couples through a straight-line processor bus 108 to all other processor modules 100 of computer system 90. As such, each processor module 100 in the embodiment shown can be connected to four other processor modules 100 through the processor. bus 108. Although five processor modules 100 are shown in the exemplary embodiment of FIG. 1, any desired number of processors (e.g. 4, 6, 7, 8, 12 etc.) limited by the communication bandwidth of the processor bus can be included.

The I/O bridge unit 104 provides an interface to various input/output devices such as disk drives and display devices as described in greater detail below. Data from the I/O devices thus enters the processor bus 108 of the computer system via the I/O bridge unit 104.

In accordance with the preferred embodiment, the main memory 102 generally includes a conventional memory device or an array of memory devices in which application programs and data are stored. The capacity of the main memory 102 can be any suitable size. Further, main memory 102 preferably is any suitable type of memory such as dynamic random access memory ("DRAM") or any of the various types of DRAM circuits such as synchronous dynamic random access memory ("SDRAM")

In one exemplary embodiment, an off-chip external cache 106 couples to a processor module 100 through the processor bus 108. The external cache may be a 1.75-MB, seven-way set associative write-back mixed instruction and data cache. Preferably, the L2 cache holds physical address data for each block. Alternatively in another exemplary embodiment, memory cache 106 may be integrated on-chip into the processor in processor module 100. The on-chip memory cache may be unified instruction and data cache. In the preferred embodiment, the memory cache 106 preferably comprises a 64-KB, two-way set associative, virtually indexed, physically tagged, write-back memory cache with 64-byte cache blocks. During each cycle the memory cache 106 preferably performs one of the following transactions: two quadword (or shorter) read transactions to arbitrary addresses, two quadword write transactions to the same aligned octaword, two non-overlapping less-than quadword writes to the same aligned quadword, or one sequential read and write transaction from and to the same aligned octaword. Preferably, each data cache block contains 64 data bytes and associated quadword ECC bits, tag parity bit calculated across the tag and one bit to control round-robin set allocation. The memory cache 106 is organized to contain two cache sets, each with 512 rows containing 64-byte blocks per row (i.e., 32 KB of data per cache set).

In general, computer system 90 can be configured so that any processor module 100 can access its own main memory 102 and I/O devices as well as the main memory and I/O devices of all other processors in the network. Preferably, the computer system has physical connections between each processor module resulting in low interprocessor communication times and improved memory and I/O device access reliability.

Figure 2:
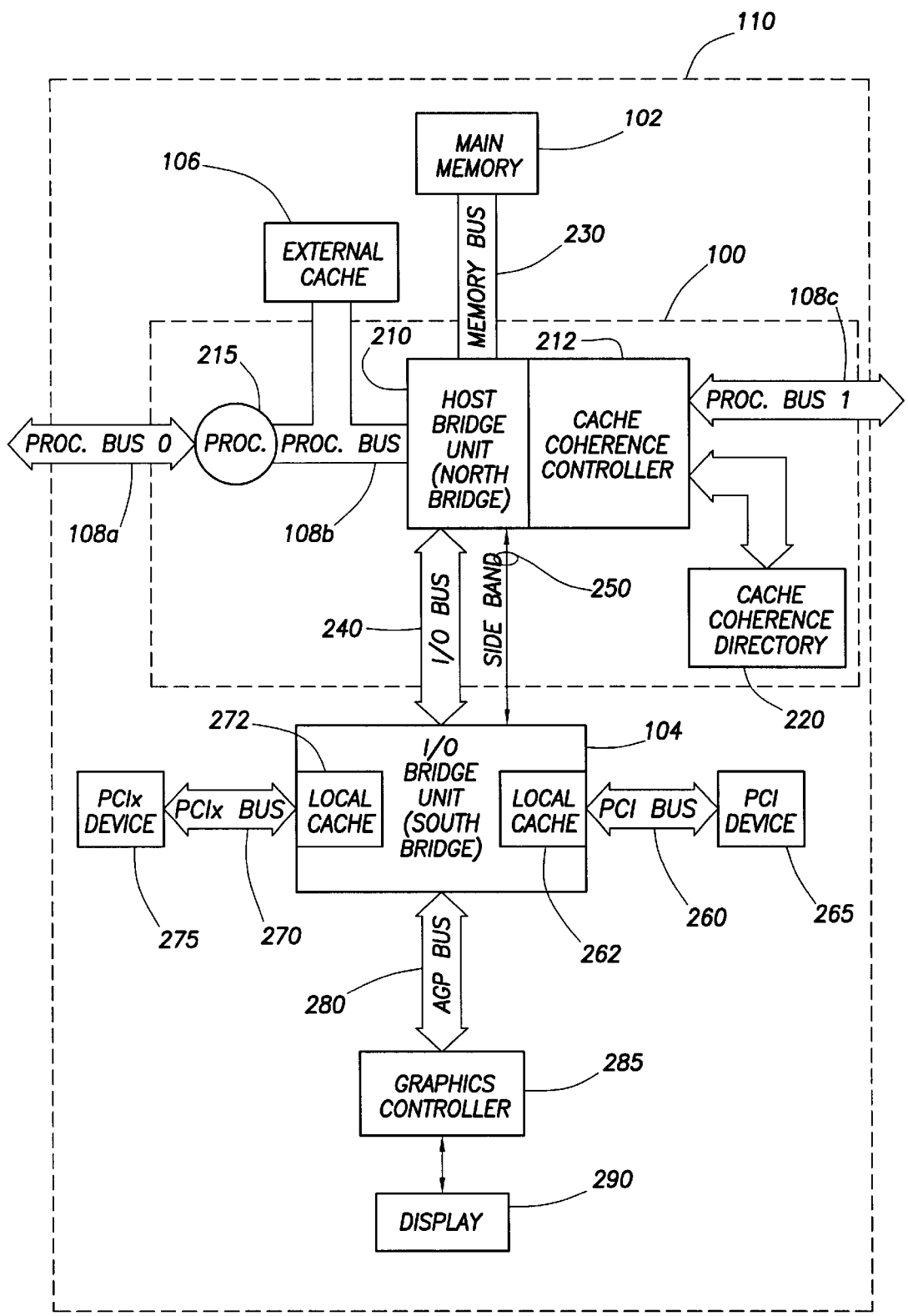
FIG. 2 shows a block diagram of the hardware to identify memory requests as non-cacheable to reduce cache coherence directory lookups and bus snoops in accordance with the preferred embodiment.

Referring now to FIG. 2, each hardware block 110 preferably includes main memory 102 coupled to processor module 100 through a memory bus 230. External cache 106 of the preferred embodiment couples to processor module 100 through processor bus 108. The processor module 100 preferably includes multiple processor buses 108 (e.g. processor bus 0 and processor bus 1) coupling to other processor modules and external caches. An I/O bridge unit (South bridge or I/O controller) 104 couples to the processor module 100 through an I/O bus 240. In the preferred embodiment, a side band signal 250 also couples the processor module 100 to the I/O bridge unit 104. I/O bridge unit 104 preferably couples the processor module 100 to various peripheral devices through a variety of different peripheral buses. In the preferred embodiment shown, a PCI bus 260 couples the PCI device 265 to the I/O bridge unit 104. Examples of PCI devices which can be coupled to the PCI bus include network interface cards, video accelerators, audio cards, SCSI adapters, and telephony cards, to name a few. The I/O bridge unit 104 also may couple to PCIx devices 275 through a PCIx bus 270. Preferably, the I/O bridge unit 104 also couples the processor module 100 to a graphics controller 285 through an AGP bus 280. In the preferred embodiment, the graphics controller 285 is coupled to a display 290. A suitable display 290 may include, for example, a cathode ray tube ("CRT"), a liquid crystal display ("LCD"), or a virtual retinal display ("VRD"), or any other type of suitable display device for a computer system. The graphics controller controls the output sent to the display 290.

Preferably, the processor module 100 includes a host bridge unit (North Bridge or memory controller) 210 that couples to a processor 215 through the processor bus 108. The external cache 106 of the preferred embodiment couples through the processor bus 108 to the host bridge unit 210 and processor 215. Preferably, processor bus 0 108a couples the processor to another processor in the computer system 90. The host bridge unit 210 also couples to the main memory 102 through the memory bus 230. I/O bridge unit 104 couples to the host bridge unit 210 through the I/O bus 240 and side band signal 250. In the preferred embodiment, processor module 100 also includes a cache coherence directory 220 that couples to the host bridge unit 210. Processor bus 1 108c couples other processors of computer system 90 to processor 215 through host bridge unit 210. The components discussed above are described in greater detail below.

Processor bus 108 couples the processor 215 to the host bridge unit 210 and the memory bus 230 couples the host bridge unit 210 to the main memory 102. The processor 215 is illustrative of, for example, a Pentium® Pro Microprocessor. It should be understood, however, that other alternative types of processors could be employed. The main memory controller (not shown in FIG. 2) typically is incorporated within the host bridge unit 210 to generate various control signals for accessing the main memory 102. An interface to a high bandwidth local expansion bus, such as the PCI bus, may also be included as a separate I/O bridge unit.

In applications that are graphics intensive, a separate peripheral bus optimized for graphics related data transfers is provided. A popular example of such a bus is the AGP bus. The AGP bus is generally considered a high performance, component level interconnect bus optimized for three dimensional graphical display applications, and is based on a set of performance extensions or enhancements to the PCI standard. In part, the AGP bus was developed in response to the increasing demands placed on memory bandwidths for three-dimensional renderings. With the advent of AGP, a graphics controller can be removed from the PCI bus (where it traditionally was located) to the AGP bus. AGP provides greater bandwidth for data transfer between a graphics accelerator and system memory than is possible with PCI or other conventional bus architectures. The increase in data rate provided by AGP allows some of the three dimensional rendering data structures, such as textures, to be stored in main memory, reducing the cost of incorporating large amounts of memory local to the graphics accelerator or frame buffer. Although the AGP bus uses the PCI specification as an operational baseline, it provides two significant performance extensions or enhancements to that specification. These extensions include a deeply pipelined read and write operation and demultiplexing of address and data on the AGP bus.

Graphics controller 285 controls the rendering of text and images on display 290. Graphics controller 285 may embody a typical graphics accelerator generally known in the art to render three-dimensional data structures on display 290. These data structures can be effectively shifted into and out of main memory 102. The graphics controller 285 therefore may be a master of the AGP bus 280 in that it can request and receive access through the I/O bridge unit 104 to a target interface within the host bridge unit 210 to thereby obtain access to main memory 102. A dedicated graphics bus accommodates rapid retrieval of data from main memory 102. For certain operations, graphics controller 285 may further be configured to generate PCI protocol transactions on the AGP bus 280. The AGP interface of the I/O bridge unit 104 may thus include functionality to support both AGP protocol transactions as well as PCI protocol transactions. Display 118 is any electronic display device upon which an image or text can be represented.

The prior discussion describes one embodiment of computer system 90 for coupling together various computer buses. Computer system 90 can be implemented with respect to the particular bus architectures shown in FIG. 2 (i.e., PCI, PCIx, and AGP buses), or other bus architectures, as desired. The embodiment described herein, however, assumes buses 260, 270, and 280 represent a PCI bus, PCIx bus, and an AGP bus, as shown in FIG. 2. Further, processor 215 is assumed to be a Pentium® Pro processor and thus processor bus 108 represents a Pentium Pro bus®. These bus protocols and the terminology used with respect to these protocols are well known to those of ordinary skill in the art. If a more thorough understanding of the PCI, PCIx, AGP, or Pentium® Pro buses is desired, reference should be made to the *PCI Local Bus Specification* (1993), *Accelerated Graphics Port Interface Specification* (*Intel*, 1996), and *Intel P6External Bus Specification*.

Host bridge unit 210 of the preferred embodiment includes a cache coherence controller 212 that preferably implements the coherence protocol. A memory request from a peripheral device is transmitted to the host bridge unit 210. The host bridge unit 210 is informed through sideband signal 250 that a memory request is non-cacheable. The host bridge unit does not send the memory request to the cache coherence controller 212. Thus, the cache coherence controller 212 for non-cacheable memory requests does not perform a cache coherence directory lookup and evaluation. For non-cacheable memory requests, the host bridge unit 210 will return a coherent response indicating that main memory 102 of the owner processor contains the most recent copy. Thus, under this implementation, the coherent response from the host bridge unit 210 is significantly faster than those memory requests requiring a cache coherence directory lookup. If the memory request is cacheable and a snoop of the processor bus 108 is required, the host bridge unit 210 broadcasts the memory request to the appropriate processor cache 106 using the processor bus 108. In the preferred embodiment of the invention described, if a significant number of non-cacheable memory request cycles exist, excluding them from the cache coherence directory lookup and comparison process results in significantly increased bus performance and reduced snoop traffic.

For non-cacheable memory, transactions on the processor bus 108 preferably follow a strong ordering model for memory accesses, I/O accesses, locked memory accesses, and PCI configuration accesses. Strong ordering of transactions means that the transactions are completed on the processor bus 108 in the order in which they were initiated. If additional explanation of the ordering rules identified above for the Pentium® Pro bus is desired, reference may be made to the *Pentium Pro Family Developer's Manual, Volume 3: Operating System Writer's Manual.*

I/O bridge unit 104 receives requests for instructions and data from the peripheral devices. The I/O bridge unit 104 transmits the memory request to the host bridge unit 210 that then performs a cache coherence directory lookup based on if the memory request was cacheable or non-cacheable. The I/O bridge unit 104 includes local cache 262 coupled to each PCI device 265 through a PCI bus 260. PCI devices coupled to the PCI bus 260 may request the I/O bridge 104 to fetch data and instructions from main memory 102 or cache 106. Preferably, the I/O bridge 104 is implemented to constantly prefetch and store data and instructions into the local cache 262 to try to stay ahead of PCI device requests. PCIx devices, 275, coupled to the PCIx bus 270 request from the I/O bridge 104 a range of memory that it will need in the future. Because the data fetched is not needed immediately, PCIx data and instructions are generally tagged as non-cacheable. The data is retrieved from main memory 102 and stored into local cache 272. Because most of the data and instructions requested by PCIx devices are non-cacheable, memory requests from PCIx devices can benefit significantly from the apparatus to bypass cache coherence directory lookups and bus snoops described in the preferred embodiment of the invention.

Traditionally, the AGP bus is provided as a part of the host bridge unit 210. According to the preferred embodiment, the graphics controller 285 couples to the I/O bridge unit 104 through the AGP port or bus 280. Connection of graphics devices to the I/O bridge unit 104 rather than interfaced directly to the host bridge unit 210 offers greater flexibility in the design of the I/O subsystem. Devices coupled to the AGP bus 280 benefit from bypassing cache coherence directory lookups and bus snoops for non-cacheable requests of data to main memory as described in the preferred embodiment of the invention. This is because AGP enabled graphics devices are capable of non-cacheable data transfer rates peaking at 1 Gigabyte/sec. If the preferred embodiment of the invention that allows distinguishing between cacheable and non-cacheable memory requests is not implemented, requests to memory from AGP devices will significantly impact bus snoop performance.

In the preferred embodiment of the invention, the I/O bus 240 couples the host bridge unit 210 to the I/O bridge unit 104. The I/O bus 240 generally does not support identification of cacheable and non-cacheable requests for data and instructions as part of its bus protocol. Thus, use of the I/O bus 240 by itself degrades performance as bus snoops are performed unnecessarily for data and instructions that are non-cacheable. In accordance with the preferred embodiment, one solution to this problem is for the host bridge unit 210 to support a sideband signal 250 that identifies non-cacheable memory requests. When the host bridge unit 210 receives a memory request in which the sideband signal 250 is asserted indicating that the data or instructions are non-cacheable, the host bridge unit will not request the cache coherence controller to perform a cache coherence directory lookup or snoop the processor buses.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for identifying memory requests originating on remote I/O devices as non-cacheable in a computer system with multiple processors, comprising:

a main memory coupled to a host bridge unit, wherein said host bridge unit includes a cache coherence controller that implements a protocol to maintain the coherence of data stored in a plurality of processor caches in the computer system;

a cache coherence directory coupled to said cache coherence controller;

an I/O bridge unit coupled to said host bridge unit; and a peripheral bus coupled to said I/O bridge unit, said peripheral bus transmitting requests from a peripheral device coupled to the peripheral bus for data to the I/O bridge unit, wherein said I/O bridge unit transmits the request for data to the host bridge unit and asserts a sideband signal to the host bridge unit if the request is for non-cacheable data.

2. The apparatus of claim 1, wherein said cache coherence directory includes the addresses of data stored in each of the processor caches and the state of the data, wherein said host bridge unit recognizes requests for data as cacheable or non-cacheable, and said host bridge unit requests the cache coherence controller to bypass the cache coherence directory lookup for non-cacheable data.

3. The apparatus of claim 1 wherein said host bridge unit comprises a memory controller.

4. The apparatus of claim 1 wherein said peripheral bus is an advanced graphic port ("AGP") bus.

5. The apparatus of claim 4 wherein said peripheral device is an I/O device.

6. The apparatus of claim 1 wherein said peripheral bus is a peripheral component interconnect ("PCI") bus.

7. The apparatus of claim 1 wherein said peripheral bus is a peripheral component interconnect extended ("PCIx") bus.

8. An apparatus in a computer system for identifying memory requests originating on remote I/O devices as non-cacheable, comprising:

a memory cache coupled to a first bridge unit;

a main memory coupled to said first bridge unit, wherein said first bridge unit includes a cache coherence controller that implements a protocol to maintain the coherence of data stored in a plurality of processor caches in the computer system;

a cache coherence directory coupled to said cache coherence controller;

a secondary bridge unit coupled to said first bridge unit;

a peripheral bus coupled to said secondary bridge unit, said peripheral bus transmitting requests from a peripheral device coupled to the peripheral bus for data to the secondary bridge unit, wherein said secondary bridge unit transmits the request for data to the first bridge unit and asserts a sideband signal to the first bridge unit if the request is for non-cacheable data; and a display coupled to said secondary bridge unit.

9. The apparatus of claim 8, wherein said cache coherence directory includes the addresses of data stored in each of the processor caches and the state of the data, wherein said first bridge unit recognizes requests for data as cacheable or non-cacheable, and said first bridge unit requests the cache coherence controller to bypass the cache coherence directory lookup for non-cacheable data.

10. The apparatus of claim 8 wherein said first bridge unit comprises a memory controller.

11. The apparatus of claim 8 wherein said peripheral bus is an advanced graphic port ("AGP") bus.

12. The apparatus of claim 11 wherein said peripheral device is an I/O device.

13. The apparatus of claim 8 wherein said peripheral bus is a peripheral component interconnect ("PCI") bus.

14. The apparatus of claim 8 wherein said peripheral bus is a peripheral component interconnect extended ("PCJx") bus.

15. The apparatus of claim 8 wherein said computer system includes multiple processors coupled together through a processor bus.

16. The apparatus of claim 8 wherein said secondary bridge unit is a South Bridge.

17. The apparatus of claim 8 wherein said secondary bridge unit comprises an I/O controller.

18. The apparatus of claim 8 wherein said first bridge unit comprises a memory controller.

19. The apparatus of claim 8 wherein said cache coherence directory is located in the first bridge unit.

20. A method for identifying memory requests originating on remote I/O devices as non-cacheable in a multiprocessing computer system, comprising:

transmitting requests for data from an I/O device to an I/O bridge unit, said I/O bridge unit coupled to a host bridge unit;

identifying the requests for data as cacheable or non-cacheable, wherein said I/O bridge unit transmits the request for data to the host bridge unit and asserts a sideband signal to the host bridge unit if the request is for non-cacheable data; and requesting the cache coherence controller bypass the cache coherence directory lookup for non-cacheable data.

* * * * *